H. O. HANNA.
GLARE DEFLECTOR.
APPLICATION FILED JULY 22, 1920.
1,409,340.
Patented Mar. 14, 1922.
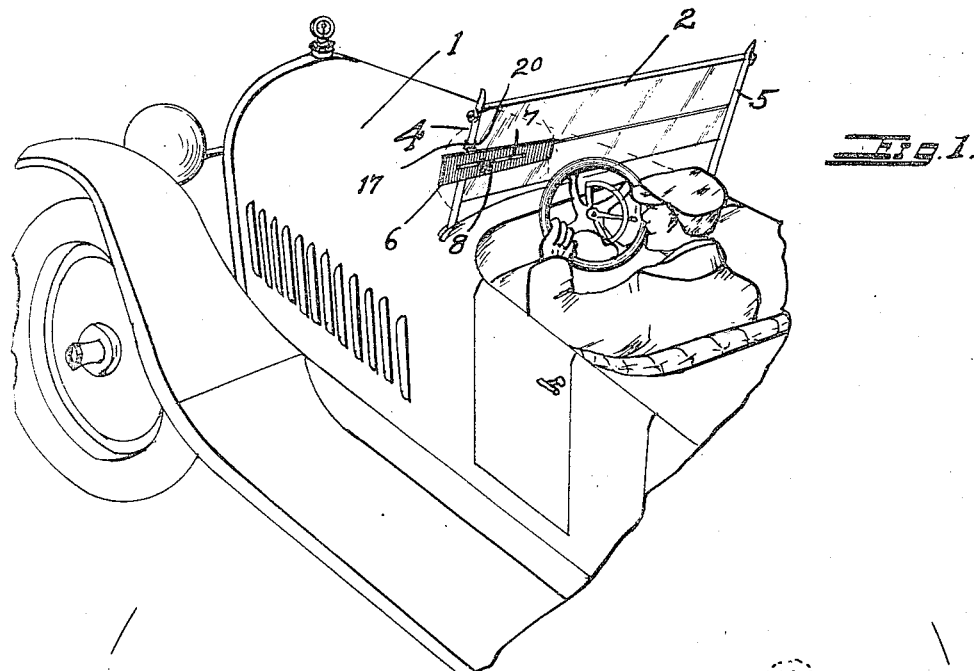
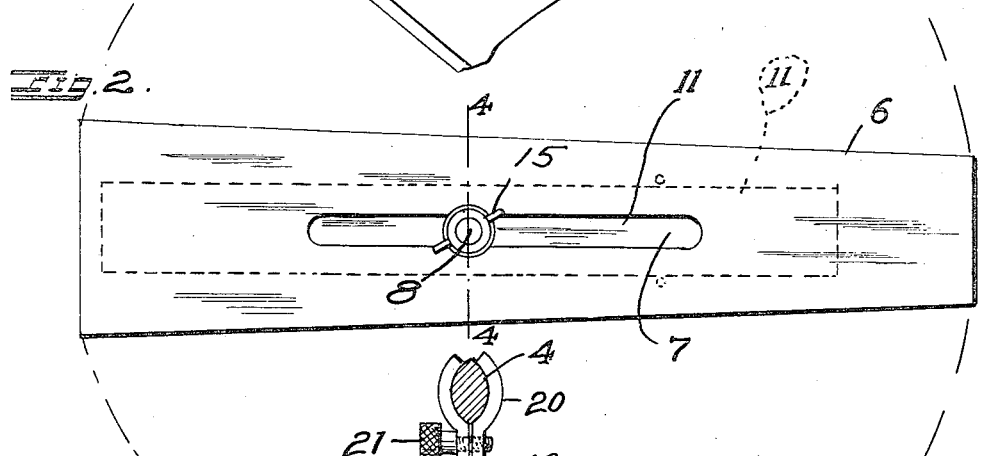
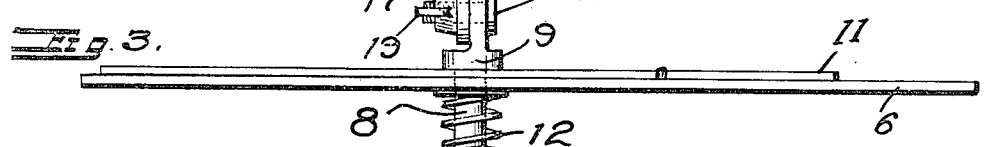
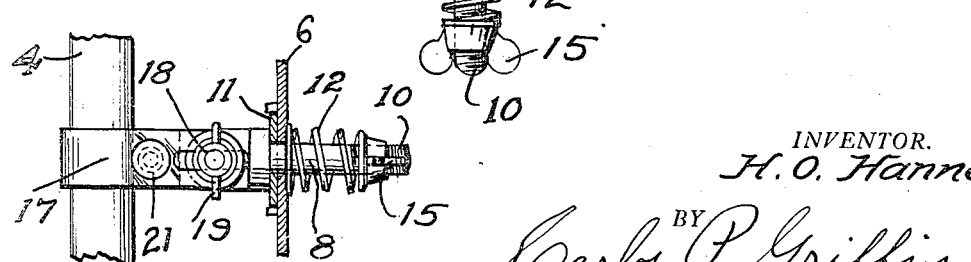
INVENTOR.
H. O. Hanna.
BY Carlos P. Griffin
ATTORNEY.

UNITED STATES PATENT OFFICE.

HENRY O. HANNA, OF OAKLAND, CALIFORNIA, ASSIGNOR OF ONE-HALF TO EDWIN S. READER, OF OAKLAND, CALIFORNIA.

GLARE DEFLECTOR.

1,409,340.              Specification of Letters Patent.     Patented Mar. 14, 1922.

Application filed July 22, 1920. Serial No. 398,201.

*To all whom it may concern:*

Be it known that I, HENRY O. HANNA, a citizen of the United States, residing at Oakland, in the county of Alameda, State of California, have invented a new and useful Glare Deflector, of which the following is a specification in such full and clear terms as will enable those skilled in the art to construct and use the same.

This invention relates to glare deflectors for motor vehicles and other means of transportation, and has for one of its objects the provision of means for shielding the eyes of drivers of motor vehicles from the glare of the lamps of other motor vehicles approaching from the opposite direction, or from the reflected glare of some classes of road surface.

Another object is to provide a glare deflector that can be readily attached and adjusted vertically or horizontally and that can be swung out of the way when not required.

Another object is to make the device strong and simple in construction.

Other objects of the invention will appear as the description proceeds.

An embodiment of the invention is shown in the accompanying drawings in which the same reference numeral is applied to the same portion throughout, but I am aware that there may be modifications thereof.

Figure 1 is a perspective view of the front portion of an automobile with the glare deflector attached, showing one application of the invention.

Fig. 2 is a side elevation of the device on a larger scale.

Fig. 3 is a plan view and

Fig. 4 is a view partly in section on line 4—4 of Fig. 2.

The numeral 1 indicates an automobile with the wind shield 2 and side supports 4 and 5.

Clamped to the support 4 is the glare deflecting board 6. A slot 7 provides for horizontal movement on the bolt 8, which has the head 9 and the threaded portion 10. A flat strip 11 with a hole for the bolt 8 is provided to keep the slot 7 covered at all times, the strip 11 and board 6 being held in frictional contact by means of the spring 12, the head 9 and wing nut 15.

Projecting from the head 9 is the lug 16 against which the clamp 17 is held by the bolt 18 and wing nut 19. In this instance the clamp 17 is made to fit the side support 4, with a similar clamp 20 adapted to be drawn up tight on the support by the threaded bolt 21. In operation the device is clamped in place at the desired height by means of the clamps 17 and 20 and bolt 21, then the proper angle is given to the board 6 by means of the bolt 18 and wing nut 19. The board 6 can be adjusted horizontally on the bolt 8 and also turned on the bolt as a pivot, which allows of its being turned to a vertical position when not in use.

What I claim is as follows, but various modifications may be made in the construction shown in the drawings and above particularly described form, within the purview of my invention:

1. A glare deflector for motor vehicles comprising a longitudinally slotted board adapted to be held a predetermined distance from the eyes of the driver of said motor vehicle, a strip over which the board slides for covering the slot in the board, and means for holding said board in various adjusted positions.

2. A glare deflector, for motor vehicles comprising a board adapted to be held on the wind shield frame of a motor vehicle, a slot in said board, a bolt extending through said slot and on which the board is slidable adapted to slide in said slot, a head on said bolt, a cover strip over said slot, a tension spring on said bolt provided with an adjusting nut and acting to hold said board and said cover strip in frictional contact with each other, a lug on said bolt head, a clamp bracket pivoted on said lug, and means for holding said bracket in various positions, a movable clamp jaw held in place by a threaded bolt and acting with said clamp bracket to hold said board on said wind shield frame.

In testimony whereof I have hereunto set my hand this 10th day of June A. D. 1920.

HENRY O. HANNA.